United States Patent [19]

Coaker et al.

[11] 3,948,674

[45] Apr. 6, 1976

[54] LUBRICATED THERMOPLASTIC RESIN COMPOSITIONS

[75] Inventors: Antony W. M. Coaker; Elmer E. Cowell, both of St. Louis, Mo.

[73] Assignee: Monsanto Company, St. Louis, Mo.

[22] Filed: Aug. 27, 1973

[21] Appl. No.: 392,144

Related U.S. Application Data

[62] Division of Ser. No. 107,526, Jan. 18, 1971, Pat. No. 3,809,667.

[52] U.S. Cl......... 106/178; 260/31.2 R; 260/31.2 N; 260/17 R
[51] Int. Cl.$^2$.................... C08K 5/10; C08L 1/10
[58] Field of Search .............. 106/178; 260/17, 86.1

[56] References Cited
UNITED STATES PATENTS

| | | | |
|---|---|---|---|
| 2,204,517 | 6/1940 | Strain | 260/86.1 E |
| 2,412,476 | 12/1946 | Semegen | 260/86.1 E |
| 2,742,443 | 4/1956 | Diggles | 106/178 |
| 2,849,410 | 8/1958 | Lamm | 260/86.1 E |
| 3,084,065 | 4/1963 | Bach | 260/86.1 E |

OTHER PUBLICATIONS

Industrial Plasticizers Mellan, 1963, pp. 72–74, 224.

*Primary Examiner*—Theodore Morris
*Attorney, Agent, or Firm*—Robert E. Wexler

[57] ABSTRACT

This disclosure relates to improved thermoplastic resin compositions which contain an acrylic homopolymer or copolymer as a lubricant.

8 Claims, No Drawings

LUBRICATED THERMOPLASTIC RESIN COMPOSITIONS

This is a division of application Ser. No. 107,526, filed Jan. 18, 1971, now U.S. Pat. No. 3,809,667.

This invention relates to new and improved thermoplastic resin compositions having excellent physical properties such as fusion, workability, stability, flow and heat distortion temperature. More particularly, this invention is concerned with novel, easily processable compositions comprising a thermoplastic resin and a minor proportion of an alkyl acrylate homopolymer or copolymer which, at room temperature or slightly above, range from free-flowing to viscous liquids.

It is well known that polyvinyl aromatic compounds are characterized by improved properties of toughness when a small amount of a rubbery polymer is added thereto. In order to mold such thermoplastic materials, it is necessary to employ agents which improve moldability, such as lubricants.

Vinyl chloride polymers are generally hard, rigid, chemically resistant thermoplastic materials and, consequently, are widely used in various applications such as chemical processing equipment, pipes, sheeting, moldings, building panels and the like. A major disadvantage of this material is its poor impact resistance. Incorporation of relatively large amounts of plasticizers or other compounding ingredients to improve the physical properties and processing characteristics of vinyl chloride resins, has not resulted in a product which is suitable for use where a relatively high impact strength is required. Additionally, vinyl chloride resins are often difficult to process since the resins tend to degrade before reaching the melt viscosity necessary to assure good melt flow characteristics.

Nylon is a well-known substance and may be readily prepared by polycondensation of dicarboxylic acids and diamines or by polycondensation of amino acids to provide high molecular weight polymers. Particularly desirable nylon is prepared by the polycondensation of hexamethylene diamine and adipic acid or by the polycondensation of 6-aminocaproic acid. It is also well known that commercially prepared nylon is difficult to handle in friction producing operations. In order to provide nylon possessing high lubricity and low-friction characteristics, it is necessary to incorporate a lubricating agent into the polymeric material.

Polycarbonate resins have found many useful applications in the plastics industry because their physical properties, coupled with chemical properties, are comparable to those of polystyrene, polymethacrylate and cellulose esters. The polycarbonate resins are widely employed to fabricate hard, rigid and solid articles such as cam bearings, switches, levers, hardware, pipes, fittings, valves, etc. The industrial use of these resins is considerably restricted, however, since the resins are fabricated only with great difficulty. More workable and useful polycarbonate resin compositions having improved lubricity characteristics are provided by addition of a lubricating agent with the polycarbonate resin.

Accordingly, it is a principal object of this invention to provide an additive for thermoplastic resin compositions which provides the desired processing and lubricating properties.

Other objects and advantages of the invention will be apparent to those skilled in the art from the following detailed description and claims.

In accordance with this invention, it has been found that the above and still further objects are accomplished by incorporating a thermoplastic resin and a minor quantity of a liquid homopolymer of an alkyl acrylate or a liquid copolymer of an alkyl acrylate with a dissimilar alkyl acrylate component copolymerizable therewith.

The alkyl acrylate esters which are suitable for use in the production of the processing aids of the present invention are those in which the alkyl group is linear or branch-chained and contains from 1 to about 24 carbon atoms. Examples of these esters are methyl acrylate, ethyl acrylate, propyl acrylate, butyl acrylate, tert.-butyl acrylate, pentyl acrylate, isopentyl acrylate, hexyl acrylate, heptyl acrylate, octyl acrylate, 2-ethylhexyl acrylate, decyl acrylate, lauryl acrylate, dodecyl acrylate, tetradecyl acrylate, pentadecyl acrylate, octadecyl acrylate, nonadecyl acrylate, eicosyl acrylate, heneicosyl acrylate, docosyl acrylate, tricosyl acrylate, tetracosyl acrylate and the like. Although any alkyl acrylate monomer falling within the above description can be employed, it is preferred to employ alkyl acrylates in which the alkyl group contains from about 2 to about 12 carbon atoms and particularly ethyl acrylate and 2-ethylhexyl acrylate.

Vinyl aromatic resins suitable for use in the present invention are homopolymers and copolymers of monovinyl-substituted aromatic hydrocarbon compounds having the vinyl group attached to a carbon atom of the aromatic nucleus substituted with one or more groups such as methyl, ethyl and chloro groups. The preferred polyvinyl aromatic resins utilize styrene as the vinyl aromatic constituent. In addition, the monovinyl-substituted aromatic constituent may also be admixed or interpolymerized with from about 1 to about 250 parts by weight, per 100 parts by weight of monovinyl-substituted aromatic constituent, of a synthetic rubber such as polybutadiene, polyisoprene, copolymers of butadiene and styrene and copolymers of butadiene and acrylonitrile, which improve the properties of toughness. The preferred polymers suitable for this invention include styrene, butadiene and acrylonitrile components such as the copolymer of styrene with butadiene, and the terpolymer of styrene, acrylonitrile and butadiene. Illustrative examples of substances that can be copolymerized with the monovinylsubstituted aromatic hydrocarbon to form a copolymer are one or more other ethylenically unsaturated compounds such as ethylene, propylene, isobutylene, butadiene, isoprene, chloroprene, vinyl halides such as vinylchloride, vinyl esters such as vinyl acetate and vinyl butyrate, acrylic and alpha-substituted acrylic acids and the esters, nitriles and amides thereof such as methyl acrylate, ethyl acrylate, acrylonitrile, acrylamide, methyl methacrylate, butyl methacrylate, methyl phenacrylate, methacrylonitrile, methacrylamide and alpha-beta-ethylenically unsaturated dicarboxylic acids and anhydrides and the esters and amides and nitriles thereof such as maleic acid, maleic anhydride, fumaric acid, fumaronitrile, divinyl benzene and the like.

The "vinyl halide polymers" of this invention are homopolymers of vinyl compounds such as vinyl chloride, vinyl bromide, vinyl fluoride and vinyl iodide, as well as copolymers of such vinyl compounds with one or more other ethylenically unsaturated monomers copolymerizable therewith. Illustrative are the copolymers of vinyl halide monomers with one or more other monomers such as ethylene, propylene, isobutylene, butadiene and the like; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate and the corresponding esters of methacrylic acid; vinyl aromatic compounds, e.g., styrene, ortho-chlorostyrene, para-chlorostyrene; diene such as butadiene and chlorobutadiene; unsaturated amides such as acrylic acid amide and acrylic acid anilide; unsaturated nitriles such as acrylic acid nitrile; esters of alpha-beta-unsaturated carboxylic acids, e.g., the methyl, ethyl, propyl, butyl, amyl, hexyl, heptyl, octyl, allyl and phenyl esters of maleic, crotonic, itaconic and fumaric acids and the like; vinyl halides such as vinylidene bromide, vinylidene chloride and the like. Those copolymers in which a predominant portion, i.e., more than 50% by weight of the copolymer, is made from vinyl chloride represent a preferred class of polymers to be treated according to this invention. Included within the meaning of the phrase "vinyl halide polymers" are graft copolymers of vinyl halides on backbones of rubbery materials such as chlorinated polyethylene as well as polyblends of vinyl halides with rubbery interpolymers such as a styrene-butadiene interpolymer or butadiene-acrylonitrile interpolymer.

The term "polycarbonate resin", as used herein, is meant to designate thermoplastic resins of linear aliphatic, cycloaliphatic and aromatic polyesters of carbonic acid. These thermoplastic polycarbonates may be produced from a great number of aliphatic, cycloaliphatic and aromatic dihydroxy compounds.

Illustrative of the aliphatic dihydroxy compounds which can be employed are ethylene glycol, diethylene glycol, triethylene glycol, polyethylene glycol, thioglycol, ethylene dithioglycol, 1,3-propanediol, 1,3-butanediol, 1,4-butanediol, 1,3-(2-methyl) propanediol, 1,5-pentanediol, 1,6-hexanediol, 1,8-octanediol, 1,10-decanediol. Illustrative of cycloaliphatic dihydroxy compounds are 1,4-cyclohexanediol, 1,2-cyclohexanediol, 2,2-(4,4'-dihydroxydicyclohexylene)propane and 2,6-dihydroxydecahydronaphthalene. Illustrative of the aromatic dihydroxy compounds are hydroquinone, resorcinol, pyrocatechol, 4,4'-dihydroxydiphenyl, 1,6-dihydroxynaphthalene, 2,6-dihydroxynaphthalene, 1,4-dihydroxynaphthalene, 1,5-dihydroxynaphthalene, dihydroxyanthracene, 2,2'-dihydroxydinaphthyl-1,1' and o,m,p-hydroxybenzyl alcohol and the like; dimonohydroxyaryl)sulfones such as di-(4-hydroxyphenyl)sulfone, di-(2-hydroxyphenyl)sulfone, di-(3-hydroxyphenyl)sulfone, di-(4-hydroxy-2-methylphenyl)sulfone, di-(4-hydroxy-3-methylphenyl)sulfone, di-(2-hydroxy-4-methylphenyl)sulfone, di-(4-hydroxy-2-ethylphenyl)sulfone, di-(4-hydroxy-3-ethylphenyl)sulfone, di-(4-hydroxy-2-tert.-butylphenyl)sulfone, di-(4-hydroxy-3-tert.-butylphenyl)sulfone, di-(2-hydroxy-1-naphthyl)sulfone and the like; di-(monohydroxyaryl)alkanes such as:

1,1-di(4-hydroxyphenyl)ethane,
1,1-di(4-hydroxyphenyl)propane,
1,1-di(4-hydroxyphenyl)butane,
1,1-di(4-hydroxyphenyl)-2-methyl-propane,
1,1-di(4-hydroxyphenyl)heptane,
1,1-di(4-hydroxyphenyl)-1-phenylmethane,
di-(4-hydroxyphenyl)-4-methylphenyl-methane,
di-(4-hydroxyphenyl)-4-ethylphenyl-methane,
di-(4-hydroxyphenyl)-4-isopropylphenyl-methane,
di-(4-hydroxyphenyl)-4-butylphenyl-methane,
di-(4-hydroxyphenyl)benzylmethane,
di-(4-hydroxyphenyl)-α-furylmethane,
2,2-di(4-hydroxyphenyl)octane,
2,2-di(4-hydroxyphenyl)nonane,
di-(4-hydroxyphenyl)-1-α-furyl-ethane,
1,1-di(4-hydroxyphenyl)cyclopentane,
2,2-di(4-hydroxyphenyl)decahydronaphthalene,
2,2-di(4-hydroxy-3-cyclohexylphenyl)propane,
2,2-di(4-hydroxy-3-isopropylphenyl)butane,
1,1-di(4-hydroxy-3-methylphenyl)cyclohexane,
2,2-di(4-hydroxy-3-butylphenyl)propane,
2,2-di(4-hydroxy-3-phenylphenyl)propane,
2,2-di(4-hydroxy-2-methylphenyl)propane,
1,1-di(4-hydroxy-3-methyl-6-butylphenyl)butane,
1,1-di(4-hydroxy-3-methyl-6-tert.-butylphenyl)ethane,
1,1-di(4-hydroxy-3-methyl-6-tert.-butylphenyl)propane,
1,1-di(4-hydroxy-3-methyl-6-tert.-butylphenyl)butane,
1,1-di(4-hydroxy-3-methyl-6-tert.-butylphenyl)isobutane,
1,1-di(4-hydroxy-3-methyl-6-tert.-butylphenyl)heptane,
1,1-di(4-hydroxy-3-methyl-6-tert.-butylphenyl)-1-phenyl-methane,
1,1-di(4-hydroxy-3-methyl-6-tert.-butylphenyl)-2-methyl-2-pentane,
1,1-di(4-hydroxy-3-methyl-6-tert.-butylphenyl)-2-ethyl-2-hexane,
1,1-di(4-hydroxy-3-methyl-6-tert.-amylphenyl)butane,
di-(4-hydroxyphenyl)methane,
2,2-di(4-hydroxyphenyl)propane,
1,1-di(4-hydroxyphenyl)cyclohexane,
1,1-di(4-hydroxy-3-methylphenyl)cyclohexane,
1,1-di(2-hydroxy-4-methylphenyl)butane,
2,2-di(2-hydroxy-4-tert.-butylphenyl)propane,
1,1-di(4-hydroxyphenyl)-1-phenylethane,
2,2-di(4-hydroxyphenyl)butane,
2,2-di(4-hydroxyphenyl)pentane,
3,3-di(4-hydroxyphenyl)pentane,
2,2-di(4-hydroxyphenyl)hexane,
3,3-di(4-hydroxyphenyl
2,2-di(4-hydroxyphenyl)-4-methylpentane,
2,2-di(4-hydroxyphenyl)heptane,
4,4-di(4-hydroxyphenyl)heptane,
2,2-di(4-hydroxyphenyl)tridecane,
2,2-di(4-hydroxy-3-methylphenyl)propane,
2,2-di(4-hydroxy-3-methyl-3'-isopropylphenyl)butane,
2,2-di(3,5-dichloro-4-hydroxyphenyl)propane,
2,2-di(3,5-dibromo-4-hydroxyphenyl)propane,
di-(3-chloro-4-hydroxyphenyl)methane,
di-(2-hydroxy-5-fluorophenyl)methane,
di-(4-hydroxyphenyl)phenylmethane,
1,1-di(4-hydroxyphenyl)-1-phenylethane, and the like.

The preferred class of dihydroxy compound for use in the practice of this invention are the aromatic dihydroxy compounds and in particular the di(monohydroxyaryl)alkanes.

Polycarbonates of the aforesaid di-(monohydroxyaryl) alkanes can be prepared by a number of methods known to those skilled in the art. For example, the di-(monohydroxyaryl)alkanes can be re-esterified with carbonic acid diesters, e.g., dimethyl-, diethyl-, dipropyl-, dibutyl-, diamyl-, dioctyl-, dicyclohexyl-, diphenyl-, and di-o,p-tolyl-carbonate and the like, at elevated temperatures of from about 50°C. to about 320°C.

Another method available for the preparation of polycarbonates involves the introduction of phosgene into solutions of di-(monohydroxyaryl)alkanes in organic bases, such as dimethyl aniline, diethylaniline, trimethylaniline, pyridine and the like or into solutions of di(monohydroxyaryl)alkanes in different organic solvents such as ligroin, cyclohexane, methylcyclohexane, benzene, toluene, xylene, chloroform, methylene chloride, carbon tetrachloride, trichloroethylene, dichloroethane, methyl acetate, ethyl acetate and the like, with the addition of an acid-binding agent, e.g., a tertiary amine.

Still another suitable process for producing polycarbonates comprises introducing phosgene into the aqueous solution or suspension of alkali metal salts such as lithium, sodium, potassium, and calcium salts of the di(monohydroxyaryl)alkanes, preferably in the presence of an excess of a base such as lithium, sodium, potassium, and calcium hydroxide or carbonate. The polycarbonates precipitate from the aqueous solution.

The di-(monohydroxyaryl)alkanes can be reacted with bischloro-carbonates of di-(monohydroxyaryl)alkanes in the presence of inert solvents and acid-binding materials, e.g., tertiary amines.

Additional examples of thermoplastic materials suitable for use with this invention include polyvinyl acetate, cellulose ethers such as ethyl cellulose, butyl cellulose and benzyl cellulose, cellulose esters of organic acids having 2 to 4 carbon atoms such as cellulose acetate, cellulose propionate, cellulose butyrate, cellulose acetate-butyrate and cellulose acetate-propionate and polymers of α-monoolefins having 2 to 24 carbon atoms such as the polymers and copolymers, with at least one dissimilar ethylenically unsaturated monomer, of ethylene, propylene, 1-butene, 1-octene, 1-dodecene, 3-methyl-1-pentene, 3-methyl-4-ethyl-1-hexene, 3-methyl-1-butene, 1-hexene, 5-methyl-1-hexene, 3,4-dimethyl-1-pentene, 3,3-dimethyl-1-butene, 1-pentene, 3-methyl-1-hexene, 1-decene and the like. Also suitable for use with this invention are polymers of methyl methacrylate, which can be either homopolymers of methyl methacrylate or copolymers of methyl methacrylate with or more other ethylenically unsaturated monomers copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, butadiene, various amides and styrene. Those copolymers containing more than 75% of methyl methacrylate monomer units are preferred for use with this invention. Accordingly, it will be seen that the aforementioned thermoplastic resins fall into three main categories, i.e., resins derived from at least one ethylenically unsaturated monomer natural resins and polycondensation resins.

The processing and lubrication aids utilized in the thermoplastic compositions of the present invention include liquid homopolymers of alkyl acrylate esters wherein the alkyl radical is linear or branch-chained and contains from 1 to about 24 carbon atoms, and liquid copolymers of an alkyl acrylate ester with a dissimilar alkyl acrylate ester. The copolymers consist of (1) from about 5 to about 95 percent by weight of an alkyl acrylate ester wherein the alkyl constituent contains from about 1 to about 12 carbon atoms and (2) from about 95 to about 5 percent by weight of a dissimilar alkyl acrylate ester wherein the alkyl constituent contains from about 3 to about 24 carbon atoms. In a preferred embodiment of the invention, the lubricating copolymers consist of (1) from about 5 to about 95 percent by weight of an alkyl acrylate ester wherein the alkyl constituent contains from about 1 to about 12 carbon atoms and (2) from about 95 to about 5 percent by weight of a dissimilar alkyl acrylate ester wherein the alkyl constituent contains from about 3 to about 18 carbon atoms. In a yet more preferred embodiment of the invention, the useful lubricating copolymers consist of (1) from about 20 to about 50 percent by weight of an alkyl acrylate ester wherein the alkyl constituent contains from about 2 to about 8 carbon atoms and (2) from about 80 to about 50 percent by weight of a dissimilar alkyl acrylate ester wherein the alkyl constituent contains from about 6 to about 12 carbon atoms.

The acrylic lubricants utilized herein are characterized by their liquidity, ranging from free-flowing to viscous, at room temperature or slightly above. The polymers have an average molecular weight of from about 2,000 to about 10,000, a preferred molecular weight range being from about 2,000 to about 6,000. A particularly useful molecular weight range is from about 3,500 to about 5,000.

Tough or rubbery acrylate materials, such as those frequently used as extenders or impact value modifiers are unsuitable for use as lubricating aids for purposes of this invention.

The modifying homopolymer and copolymers resins described herein, and the methods of their production are well known to the art. The polymers can be obtained for example, by solution polymerization of a monomer or a mixture of two monomers in an inert organic diluent while in contact with a peroxidic catalyst. Another other method for preparing the modifiers is the mass polymerization process wherein a monomeric ingredient or mixture of monomeric ingredients is mixed with a polymerization catalyst at a temperature sufficient to cause polymerization. Emulsion polymerization procedures which entail polymerizing a monomer or a mixture of monomers as an emulsion in the presence of a suitable emulsifying agent are also suitable for the preparation of the modifiers of this invention. In the emulsion polymerization procedure, which is the preferred process for preparing the modifying resins, polymerization of the monomer or mixture of monomers is effected in the presence of water which contains dissolved therein a suitable catalyst and an emulsion stabilizing agent. Examples of suitable catalysts, include ammonium persulfate, benzoyl peroxide, hydrogen peroxide, sodium perborate and other water-soluble salts of peroxy acids. The peroxy compounds useful as catalysts may be present in amounts of from about 0.02 to 2.0% by weight of the polymerizable compound. Illustrative of the emulsion stabilizing agents useful in this process are various wetting agents, which are in general organic compounds containing both hydrophobic and hydrophilic radicals such as sodium alkyl sulfate, sulfated aromatic ether alcohol, sodium alkyl aryl sulfonate, fatty alcohol sulfate, sorbitan trioleate, and the like. The emulsion polymerization is ordinarily carried out at a temperature in the range of from 65°C. to 95°C. depending upon the nature of the polymerization system and the particularly catalyst used.

The polymeric compositions of the present invention comprise a blend of a major proportion of a thermoplastic resin and a minor proportion of a liquid alkyl acrylate homopolymer or copolymer. More particularly, the compositions comprise a blend of from about 0.001 to 8.0 parts by weight of alkyl acrylate homopolymer or copolymer for each 100 parts by weight of thermoplastic resin. A preferred composition of this invention is one wherein the quantity of lubricating agent ranges from about 0.1 to about 4.0 parts by weight per 100 parts by weight of thermoplastic resin. Incorporation of an amount of lubricating agent in excess of 8.0 parts by weight per 100 parts by weight of thermoplastic resin employed is not useful with the present invention since the system then becomes over-lubricated and difficult to process.

The polymer blends of the invention are readily prepared by mechanical methods. The thermoplastic resin and the preformed acrylate homopolymer or copolymer are intimately admixed together on a conventional mixing machine of the type normally used for mixing rubber or plastics such as a mill roll, an extruder or a Banbury mixer. Preferably, the thermoplastic resin is first placed on the mill roll and after a small rolling bank has formed in the nip of the rolls, the lubricating agent is added. The thermoplastic resin and the lubricating agent can also be mixed together to form a crude admixture which is then placed on the mill roll. Regardless of the method by which the mixing of these materials is achieved, it is necessary that the materials be mixed together or worked under a sufficient heat and pressure to insure an efficient dispersion of the lubricating agent in the thermoplastic resin so as to form a completely homogeneous material. The temperature at which this working or mastication is carried out is not critical, as long as the temperature is at least above the temperature where the thermoplastic resin fuses and below the temperature where decomposition occurs.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

In the following examples, in which parts are given by weight unless otherwise stated, the apparent viscosities of the thermoplastic resinous compositions of the present invention are evaluated according to A.S.T.M. Test No. D1703-62 on an Instron Rheometer at a temperature of 190°C. using a Length to Radius ratio of 66.32, a shear rate of 67.4 sec.$^{-1}$ and a die having a ninety degree entry angle. Samples used in determining apparent viscosities are fluxed on a two roll mill and ground into pellets prior to measurement on the rheometer. Heat distortion temperatures of the resinous compositions are determined according to A.S.T.M. Test No. D648-56 titled "Deflection Temperature of Plastics Under Load."

EXAMPLES 1 – 20

Polyvinyl chloride compositions shown in Tables I and II containing varying proportions of the lubricant of the present invention are prepared by mechanically milling the various admixtures, together with desired processing aids, stabilizers and the like, on a 6 inch × 12 inch Thropp mill rolls at a temperature of from about 170° to 210°C. A rough mix is first prepared from the performed polymers in powdered or pelleted form in a stainless steel beaker. The rough mix is placed on the heated mill rolls and thoroughly homogenized by intensive hot milling for 5 minutes or until an adequate dispersion is obtained. The compositions are then sheeted and stripped from the mill rolls. After sufficient cooling, the sheets are cut into 1 to 2 inch squares for convenient feeding to an Abbe grinder for grinding into pellet size. The apparent viscosities and heat distortion temperatures of the resulting compositions are given in Tables I and II.

TABLE I

| Composition | Parts by Weight | | | | | | | | | | |
|---|---|---|---|---|---|---|---|---|---|---|---|
| | 1 | 2 | 3 | 4 | 5 | 6 | 7 | 8 | 9 | 10 | 11 |
| Polyvinyl chloride | 100 | 100 | 100 | 100 | 100 | 100 | 100 | 100 | 100 | 100 | 100 |
| Organotin stabilizer | 2.5 | 2.5 | 2.5 | 2.5 | 2.5 | 2.5 | 2.5 | 2.5 | 2.5 | 2.5 | 2.5 |
| MBS[1] Impact modifier | — | — | — | — | — | 10 | 10 | 10 | — | — | — |
| ABS[2] Impact modifier | — | — | — | — | — | — | — | — | 10 | 10 | 10 |
| Lubricant[3] | — | 0.5 | 2.0 | — | — | — | — | — | — | — | — |
| Lubricant[4] | — | — | — | 1.0 | 3.0 | — | — | — | — | — | — |
| Lubricant[5] | — | — | — | — | — | — | 0.25 | 1.5 | — | — | — |
| Lubricant[6] | — | — | — | — | — | — | — | — | — | 1.5 | 3.0 |
| Apparent viscosity Poises × 10$^{-4}$ | 9.22 | 8.97 | 1.83 | 7.44 | 2.25 | 9.53 | 6.84 | 2.86 | 4.75 | 3.49 | 1.33 |
| Heat distortion temperature (°C.) | 67 | — | 66 | 69 | 68 | 67 | — | 64 | 65 | — | 66 |

[1] Methacrylate - butadiene - styrene terpolymer
[2] Acrylonitrile - butadiene - styrene terpolymer
[3] Copolymer of 50 parts of 2-ethylhexyl acrylate and 50 parts of octadecyl acrylate (Mol. Wt. = 4,040)
[4] Homopolymer of octadecyl acrylate (Mol. Wt. = 2,470)
[5] Homopolymer of lauryl acrylate (Mol. Wt. = 1,980)
[6] Copolymer of 30 parts of ethyl acrylate and 70 parts of 2-ethylhexyl acrylate (Mol. Wt. = 4,690)

TABLE II

| Composition | Parts by Weight | | | | | | | | |
|---|---|---|---|---|---|---|---|---|---|
| | 12 | 13 | 14 | 15 | 16 | 17 | 18 | 19 | 20 |
| Polyvinyl chloride | 100 | 100 | 100 | 100 | 100 | 100 | 100 | 100 | 100 |
| Poly(α-methylstyrene/acrylonitrile) | 2 | 2 | 2 | — | — | — | — | — | — |
| MBS[1] Impact modifier | 10 | 10 | 10 | — | — | — | — | — | — |
| ABS[2] Impact modifier | — | — | — | 10 | 10 | 10 | — | — | — |

TABLE II-continued

| Composition | Parts by Weight | | | | | | | | |
|---|---|---|---|---|---|---|---|---|---|
| | 12 | 13 | 14 | 15 | 16 | 17 | 18 | 19 | 20 |
| EVCl[3] Impact modifier | — | — | — | — | — | — | 10 | 10 | 10 |
| Polyacrylic processing aid | — | — | — | 1 | 1 | 1 | 1 | 1 | 1 |
| Organotin stabilizer | 2 | 2 | 2 | 3 | 3 | 3 | — | — | — |
| Barium-cadmium stabilizer | — | — | — | — | — | — | 2.5 | 2.5 | 2.5 |
| Phosphite stabilizer | — | — | — | — | — | — | 0.5 | 0.5 | 0.5 |
| Epoxidized soybean oil | — | — | — | — | — | — | 1 | 1 | 1 |
| Lubricant[4] | — | 1 | 2 | — | 1 | 2 | — | 1 | 2 |
| Apparent viscosity Poises × $10^{-4}$ | 6.18 | 4.96 | 3.47 | 5.81 | 5.38 | 4.12 | 5.54 | 1.80 | 1.42 |

[1]Methacrylate - butadiene - styrene terpolymer
[2]Acrylonitrile - butadiene - styrene terpolymer
[3]Ethylene - vinyl chloride copolymer
[4]Copolymer of 30 parts of ethyl acrylate and 70 parts of 2-ethylhexyl acrylate (Mol. Wt. = 3600)

Results similar to those obtained with the compositions employed in Examples 1 to 20 of Tables I and II are obtained when the following lubricants are used in place of the lubricants employed therein:

a. homopolymer of propyl acrylate
b. homopolymer of butyl acrylate
c. homopolymer of heptyl acrylate
d. homopolymer of nonyl acrylate
e. homopolymer of decyl acrylate
f. homopolymer of tetradecyl acrylate
g. homopolymer of hexadecyl acrylate
h. homopolymer of docosyl acrylate
i. homopolymer of tetracoxyl acrylate
j. copolymer of 8 parts of propyl acrylate and 92 parts of tetracosyl acrylate
k. copolymer of 85 parts of hexyl acrylate and 15 parts of propyl acrylate
l. copolymer of 20 parts of nonyl acrylate and 80 parts of docosyl acrylate
m. copolymer of 25 parts of heptyl acrylate and 75 parts of nonyl acrylate
n. copolymer of 35 parts of amyl acrylate and 65 parts of dodecyl acrylate
o. copolymer of 45 parts of decyl acrylate and 55 parts of heptadecyl acrylate
p. copolymer of 15 parts of dodecyl acrylate and 85 parts of butyl acrylate
q. copolymer of 75 parts of dodecyl acrylate and 25 parts of pentadecyl acrylate
r. copolymer of 60 parts of nonyl acrylate and 40 parts of decyl acrylate
s. copolymer of 45 parts of ethyl acrylate and 55 parts of dodecyl acrylate It is found that similar effective apparent viscosity results are also obtained when the polyvinyl chloride in the foregoing examples is replaced in each instance by an equivalent amount of a copolymer of 95 parts of vinyl chloride and 5 parts of vinyl acetate, a copolymer of 90 parts of vinyl chloride and 10 parts of vinylidene chloride or a copolymer of 70 parts of vinyl chloride and 30 parts of diethylmaleate.

EXAMPLES 21 – 64

Following the procedure of Example 1, the resinous compositions shown in Tables II – VII are prepared. The apparent viscosities and heat distortion temperatures of the compositions obtained are given below.

TABLE III

| Composition | Parts by Weight | | | | | | | | | | | |
|---|---|---|---|---|---|---|---|---|---|---|---|---|
| | 21 | 22 | 23 | 24 | 25 | 26 | 27 | 28 | 29 | 30 | 31 | 32 |
| Terpolymer of 33 parts of acrylonitrile, 66 parts of butadiene and 1 part of divinylbenzene | 100 | 100 | 100 | 100 | — | — | — | — | — | — | — | — |
| Copolymer of 74 parts of styrene and 26 parts of acrylonitrile | — | — | — | — | 100 | 100 | 100 | 100 | — | — | — | — |
| Terpolymer of 55 parts of ethylene, 41.9 parts of propylene and 3.1 parts of ethylidene norbornene | — | — | — | — | — | — | — | — | 100 | 100 | 100 | 100 |
| Phenolic antioxidant | 0.5 | 0.5 | 0.5 | 0.5 | — | — | — | — | — | — | — | — |
| Lubricant[1] | — | 1 | 2 | 5 | — | — | — | — | — | — | — | — |
| Lubricant[2] | — | — | — | — | — | 0.5 | 2 | 4 | — | — | — | — |
| Lubricant[3] | — | — | — | — | — | — | — | — | 0.5 | 1 | 2 |
| Apparent viscosity Poises × $10^{-4}$ | 6.28 | 3.44 | 3.19 | 2.35 | 2.79 | 2.23 | 1.61 | 0.82 | 3.84 | 2.37 | 2.09 | 1.85 |
| Heat distortion | | | | | | | | | | | | |

TABLE III-continued

| Composition | Parts by Weight | | | | | | | | | | | |
|---|---|---|---|---|---|---|---|---|---|---|---|---|
| | 21 | 22 | 23 | 24 | 25 | 26 | 27 | 28 | 29 | 30 | 31 | 32 |
| temperature (°C) | — | — | — | — | 94 | — | — | 93.5 | — | — | — | — |

[1]Copolymer of 40 parts of ethyl acrylate and 60 parts of 2-ethylhexyl acrylate (Mol. Wt. = 6,760)
[2]Homopolymer of lauryl acrylate (Mol. Wt. = 8,930)
[3]Copolymer of 90 parts of methyl acrylate and 10 parts of butyl acrylate (Mol. Wt. = 10,230)

TABLE IV

| Composition | Parts by Weight | | | | | | | | |
|---|---|---|---|---|---|---|---|---|---|
| | 33 | 34 | 35 | 36[4] | 37[4] | 38[4] | 39[4] | 40[4] | 41[4] |
| Polystyrene | 50 | 50 | 50 | — | — | — | — | — | — |
| Copolymer of 10 parts of butadiene and 90 parts of styrene | 50 | 50 | 50 | — | — | — | — | — | — |
| Polyethylene | — | — | — | 100 | 100 | 100 | — | — | — |
| Copolymer of 88 parts of ethylene and 12 parts of vinyl acetate | — | — | — | — | — | — | 100 | 100 | 100 |
| Lubricant[1] | — | 3 | 6 | — | — | — | — | — | — |
| Lubricant[2] | — | — | — | — | — | — | — | 1.5 | 4 |
| Lubricant[3] | — | — | — | — | 0.5 | 2 | — | — | — |
| Apparent viscosity Poises × 10⁻⁴ | 0.80 | 0.72 | 0.46 | 17.5 | 16.8 | 14.9 | 0.91 | 0.89 | 0.77 |
| Heat distortion temperature (°C.) | 84 | — | 81 | 35 | — | 40 | — | — | — |

[1]Copolymer of 80 parts of butyl acrylate and 20 parts of lauryl acrylate (Mol. Wt. = 5,410)
[2]Copolymer of 40 parts of butyl acrylate and 60 parts of lauryl acrylate (Mol. Wt. = 6,790)
[3]Homopolymer of octadecyl acrylate (Mol. Wt. = 3,200)
[4]Apparent viscosity is determined as described earlier with the exception that the rheometer is maintained at 160°C.

TABLE V

| Composition | Parts by Weight | | | | | | | | |
|---|---|---|---|---|---|---|---|---|---|
| | 42 | 43 | 44 | 45 | 46 | 47 | 48 | 49 | 50 |
| Graft copolymer of 96 parts of polyvinyl chloride on 4 parts of chlorinated polyethylene | 100 | 100 | 100 | 100 | 100 | 100 | 100 | 100 | 100 |
| Polyacrylic processing aid | 1 | 1 | 1 | 1 | — | — | — | — | — |
| Epoxidized soybean oil | 1 | 1 | 1 | 1 | — | — | — | — | — |
| Barium-cadmium stabilizer | 2.5 | 2.5 | 2.5 | 2.5 | — | — | — | — | — |
| Phosphite stabilizer | 0.5 | 0.5 | 0.5 | 0.5 | — | — | — | — | — |
| Organotin stabilizer | — | — | — | — | 2.5 | 2.5 | 2.5 | 2.5 | 2.5 |
| Lubricant[1] | — | 1.5 | — | — | — | 0.5 | 1 | — | — |
| Lubricant[2] | — | — | 1.5 | — | — | — | — | — | — |
| Lubricant[3] | — | — | — | 1.5 | — | — | — | — | — |
| Lubricant[4] | — | — | — | — | — | — | — | 5 | 7 |
| Apparent viscosity Poises × 10⁻⁴ | 6.5 | 2.0 | 6.3 | 1.3 | 4.75 | 3.78 | 2.65 | 2.86 | 2.42 |
| Heat distortion temperature (°C.) | — | — | — | — | 63 | — | 65 | — | 66 |

[1]Copolymer of 30 parts of ethyl acrylate and 70 parts of 2-ethylhexyl acrylate (Mol. Wt. = 4,760)
[2]Copolymer of 90 parts of methyl acrylate and 10 parts of butyl acrylate (Mol. Wt. = 5,320)
[3]Homopolymer of lauryl acrylate (Mol. Wt. = 7,400)
[4]Homopolymer of methyl acrylate (Mol. Wt. = 8,920)

TABLE VI

| Composition | Parts by Weight | | | | | | | | | |
|---|---|---|---|---|---|---|---|---|---|---|
| | 51[4] | 52[4] | 53[4] | 54 | 55 | 56 | 57 | 58 | 59 | 60 |
| Copolymer of 92 parts of vinyl chloride and 8 parts of vinyl acetate | 100 | 100 | 100 | — | — | — | — | — | — | — |
| Cellulose acetate butyrate polymer | — | — | — | 100 | 100 | 100 | — | — | — | — |
| Polystyrene | — | — | — | — | — | — | 100 | 100 | 100 | 100 |
| Organotin stabilizer | 2.5 | 2.5 | 2.5 | — | — | — | — | — | — | — |
| Lubricant[1] | — | 3 | 5 | — | — | — | — | — | — | — |
| Lubricant[2] | — | — | — | — | 1 | 5 | — | — | — | — |
| Lubricant[3] | — | — | — | — | — | — | — | 1 | 5 | 7 |
| Apparent Viscosity Poises × 10⁻⁴ | 3.98 | 3.84 | 3.35 | 2.16 | 2.09 | 1.77 | 1.14 | 0.98 | 0.54 | 0.46 |
| Heat distortion | | | | | | | | | | |

TABLE VI-continued

| Composition | Parts by Weight | | | | | | | | |
|---|---|---|---|---|---|---|---|---|---|
| | 51[4] | 52[4] | 53[4] | 54 | 55 | 56 | 57 | 58 | 59 | 60 |
| temperature (°C.) | 62 | — | 60 | 104 | — | 104 | 89 | — | 88 | 88 |

[1] Copolymer of 90 parts of methyl acrylate and 10 parts of butyl acrylate (Mol. Wt. = 2,100)
[2] Homopolymer of methyl acrylate (Mol. Wt. = 9,730)
[3] Homopolymer of lauryl acrylate (Mol. Wt. = 9,500)
[4] Apparent viscosity is determined as described earlier with the exception that the rheometer is maintained at 160°C.

TABLE VII

| Composition | Parts by Weight | | | |
|---|---|---|---|---|
| | 61 | 62 | 63 | 64 |
| Polymethylmethacrylate | 100 | 100 | 100 | 100 |
| Lubricant[1] | — | 1.5 | 5 | 7 |
| Apparent viscosity Poises × 10$^{-4}$ | 5.52 | 5.33 | 2.27 | 1.37 |
| Heat distortion temperature (°C.) | 84 | 86 | 91 | 93 |

[1] Copolymer of 40 parts of butyl acrylate and 60 parts of lauryl acrylate

EXAMPLES 65 – 86

The thermoplastic resins listed below in each example are mixed on a rolling mill to a homogeneous blend with 2 parts by weight, per 100 parts by weight of each thermoplastic resin, of a copolymer of 30 parts of ethyl acrylate and 70 parts of 2-ethylhexyl acrylate having a molecular weight of 4690.

| Example | Thermoplastic resins |
|---|---|
| 65 | A polycarbonate of 1,1-di(4-hydroxyphenyl)propane. |
| 66 | A polycarbonate of 2,2-di(4-hydroxyphenyl)propane. |
| 67 | A polycarbonate of 1,1-di(4-hydroxyphenyl)cyclohexane. |
| 68 | Polyvinyl acetate. |
| 69 | Ethyl cellulose. |
| 70 | Cellulose propionate. |
| 71 | Cellulose acetate-butyrate. |
| 72 | Polypropylene. |
| 73 | Polyhexamethylene adipamide. |
| 74 | A copolymer of 4 parts of ethylene and 96 parts of vinyl chloride. |
| 75 | A copolymer of 60 parts of styrene and 40 parts of methyl methacrylate. |
| 76 | A copolymer of 30 parts of styrene and 70 parts of acrylonitrile. |
| 77 | Polycaprolactam. |
| 78 | A copolymer of 98 parts of methyl methacrylate and 2 parts of methacrylic acid. |
| 79 | A copolymer of 80 parts of methyl methacrylate and 20 parts of glycidyl methacrylate. |
| 80 | A terpolymer of 85 parts of methyl methacrylate, 11 parts of acrylonitrile and 4 parts of acrylic acid. |
| 81 | A terpolymer of 50 parts of styrene, 35 parts of acrylonitrile and 15 parts of acrylic acid. |
| 82 | A terpolymer of 60 parts of vinyl chloride, 20 parts of acrylonitrile and 20 parts of acrylic acid. |
| 83 | Poly(α-methylstyrene). |
| 84 | Poly-4-methylpentene-1. |
| 85 | Polyoctadecene-1. |
| 86 | A terpolymer of 25 parts of acrylonitrile, 20 parts of butadiene and 55 parts of styrene. |

The resultant thermoplastic resinous compositions have apparent viscosities which are lower than those of compositions obtained from the thermoplastic resins in the absence of the lubricant additive.

From the foregoing results it is evident that the relative viscosity or melt flow property of the compositions of this invention is notably superior to that of the unblended thermoplastic resinous compositions. In addition, it is found that other desired physical characteristics of the compositions of the present invention such as hardness, impact strengths and heat distortion temperatures, are not unduly affected by the incorporation of the lubricant additives employed in the compositions of this invention. Furthermore, it has also been found that these compositions easily release from molds when molded and the processing temperatures of these compositions are remarkably lowered.

For many purposes, it may be desirable to blend other conventional additives with the thermoplastic resinous compositions of the present invention. For example, the properties of the resinous compositions may be modified by incorporating therewith an inert filler such as glass fibers, ground asbestos, mica and the like, dyes, pigments, plasticizers, reinforcing materials, stabilizers and the like. It will be apparent that compositions containing such other additives are within the scope of this invention. The compositions may readily be calendered to form smooth sheets and fabricated into shaped articles by conventional forming techniques, for example, by blow molding, injection molding, casting and extrusion.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a thermoplastic cellulose resin and a copolymer, liquid at about room temperature, of (1) from about 5 to about 95% by weight of an alkylacrylate wherein the alkyl radical contains from 1 to about 12 carbon atoms and (2) from about 95 to about 5% by weight of a dissimilar alkylacrylate wherein the alkyl radical contains from about 3 to about 24 carbon atoms, wherein the acrylic copolymer is present in amounts of from about 0.001 to 8.0 parts by weight per 100 parts by weight of thermoplastic resin.

2. A composition as defined in claim 1 wherein the natural resin is a cellulose ester of an organic acid having 2 to 4 carbon atoms.

3. A composition as defined in claim 2 wherein the cellulose ester is cellulose acetate butyrate polymer.

4. A composition of claim 1 wherein the liquid copolymer has an average molecular weight of from about 2000 to about 6000.

5. A composition of claim 2 wherein the liquid copolymer has an average molecular weight of from about 3500 to about 5000.

6. A composition of claim 2 wherein the liquid copolymer is a copolymer of ethylacrylate and 2-ethylhexyl acrylate.

7. A composition as defined inn claim 1 wherein the resin is a cellulose ether.

8. A composition of claim 7 wherein said cellulose ether is ethyl cellulose.

* * * * *

UNITED STATES PATENT OFFICE
CERTIFICATE OF CORRECTION

PATENT NO. : 3,948,674
DATED : April 6, 1976
INVENTOR(S) : Antony W. M. Coaker and Elmer E. Cowell It is certified that error appears in the above-identified patent and that said Letters Patent are hereby corrected as shown below:

IN THE CLAIMS

Claim 2, line 2, first word, delete "natural".

Claim 4, line 1, "Claim 1" should be --- Claim 2 ---.

Claim 7, line 1, "inn" should be --- in ---.

The following claims were omitted:

9. A composition as defined in Claim 1 wherein the liquid copolymer is a copolymer of (1) from about 5 to about 95% by weight of an alkyl acrylate wherein the alkyl radical contains from 1 to about 12 carbon atoms, and (2) from about 95 to about 5% by weight of a dissimilar alkyl acrylate wherein the alkyl radical contains from about 3 to about 18 carbon atoms.

10. A composition as defined in Claim 1 wherein the liquid copolymer is a copolymer of (1) from about 20 to about 50% by weight of an alkyl acrylate wherein the alkyl radical contains from about 2 to about 8 carbon atoms, and (2) from about 80 to about 50% by weight of a dissimilar alkyl acrylate wherein the alkyl radical contains from about 6 to about 12 carbon atoms.

UNITED STATES PATENT OFFICE
CERTIFICATE OF CORRECTION

PATENT NO. : 3,948,674
DATED : April 6, 1976
INVENTOR(S) : Antony W. M. Coaker and Elmer E. Cowell It is certified that error appears in the above-identified patent and that said Letters Patent are hereby corrected as shown below:

11. A composition as defined in Claim 1 wherein the liquid copolymer is present in amounts of from about 0.1 to about 4.0 parts by weight per 100 parts by weight of said resin.

12. A composition as defined in Claim 6 wherein the liquid copolymer is a copolymer of 30 parts of ethyl acrylate and 70 parts of 2-ethylhexyl acrylate.

13. A composition as defined in Claim 1 wherein the liquid copolymer is a copolymer of 50 parts of 2-ethylhexyl acrylate and 50 parts of octadecyl acrylate.

14. A composition as defined in Claim 6 wherein the liquid copolymer is a copolymer of 40 parts of ethyl acrylate and 60 parts of 2-ethylhexyl acrylate.

15. A composition as defined in Claim 1 wherein the liquid copolymer is a copolymer of 90 parts of methyl acrylate and 10 parts of butyl acrylate.

UNITED STATES PATENT OFFICE
CERTIFICATE OF CORRECTION

PATENT NO. : 3,948,674
DATED : April 6, 1976
INVENTOR(S) : Antony W. M. Coaker and Elmer E. Cowell It is certified that error appears in the above-identified patent and that said Letters Patent are hereby corrected as shown below:

16. A composition as defined in Claim 1 wherein the liquid copolymer is a copolymer of 80 parts of butyl acrylate and 20 parts of laurel acrylate.

17. A composition as defined in Claim 1 wherein the liquid copolymer is a copolymer of 40 parts of butyl acrylate and 60 parts of laurel acrylate.

On the Title page, "8 Claims," should read -- 17 Claims --.

Signed and Sealed this twenty-third Day of August 1977

[SEAL]

Attest:

RUTH C. MASON
Attesting Officer

C. MARSHALL DANN
Commissioner of Patents and Trademarks